INVENTORS
Wesley B. Wells and
William K. Lockhart
BY W. H. Stout

THEIR ATTORNEY

INVENTORS
Wesley B. Wells and
William K. Lockhart
BY W. L. Stout

THEIR ATTORNEY

United States Patent Office 2,908,197
Patented Oct. 13, 1959

2,908,197

WIDE ANGLE LENSES

Wesley B. Wells, Wilkinsburg, and William K. Lockhart, Penn Township, Allegheny County, Pa., assignors to Westinghouse Air Brake Company, Wilmerding, Pa., a corporation of Pennsylvania Application January 29, 1954, Serial No. 406,973

1 Claim. (Cl. 88—1)

Our invention relates to a wide angle lens or bull's-eye for the indicator lights used on control panels or the like.

The indications provided on railway track models, control panels, and the like are usually of small diameter and somewhat limited in intensity and angular spread. For particular applications, however, greater angles of spread are often required. Heretofore, when greater angles of spread have been required they have usually been obtained by using lenses or bull's-eyes having surfaces that are sand-blasted, frosted, or jewelled. Lenses of this type greatly reduce the intensity of the indication provided by the lens and thereby require more light input behind the lens to provide the same adequate intensity of indications. The jewelled type of lens is necessarily of larger size in order to have sufficient area of front surface to provide space for the large number of facets that are needed to give the wide angle of light distribution. Employment of the sand-blasted or frosted surface method of providing increased angular spread, on either front or back surface of the lens, has certain objectionable characteristics such as dilution of the normal indication from the lens with clear light due to sunlight, skylight, or artificial illumination being reflected from the sand-blasted or frosted front surface of the lens. False indications may also be caused by external light entering the front of the lens striking the frosted or sand-blasted back surface and being reflected with sufficient intensity to be mistaken for the normal indication.

It is therefore an object of our invention to provide a lens of the type described, capable of accepting the light from the associated lamp and while remaining free from the adverse effects of external light striking the lens.

Another object of our invention is to provide a lens of the type described, capable of accepting a greater solid angle of the light emitted from an associated lamp.

Another object of our invention is to provide a lens of the type described, capable of reflecting and redirecting the light from an associated lamp so as to cause the light to leave the front surface of the lens in the proper direction to produce the desired wide angular pattern of spread without frosting, sand-blasting or jewelling.

Other objects, purposes and characteristic features of our present invention will be in part obvious from the accompanying drawings and in part pointed out as the description of the invention progresses.

In practicing our invention we provide a lens comprising a light transmitting portion and an integral light receiving and reflecting portion of greater width than the light transmitting portion, thus forming a surface therebetween, used as a mounting surface. The light receiving and reflecting portion is provided with a light receiving recess in its lower surface. The sides of the recess and the light receiving portion are at such a position with respect to the light source, the light transmitting portion and each other, that all light rays striking these surfaces are directed into the light transmitting portion giving a greater concentration of light per lamp wattage. The upper light transmitting surface is concave or inverted cone shaped thus providing a wide spread of the light making possible observation of the lens-passed light over a wide angle.

Light intensity greater than obtained heretofore is produced by the lenses disclosed herein. These lenses are arranged to utilize a greater solid angle of light from the lamp. One such lens shown herein utilizes approximately half of the available light from the lamp. The use of smooth glass surfaces instead of sand-blasted or frosted surfaces results in the elimination of loss due to excessive dispersion or absorption of light, thereby materially increasing the intensity of the indication for the same light input.

In describing our invention in detail reference will be made to the accompanying drawings in which corresponding parts are generally identified by corresponding reference characters and in which.

Figure 1:
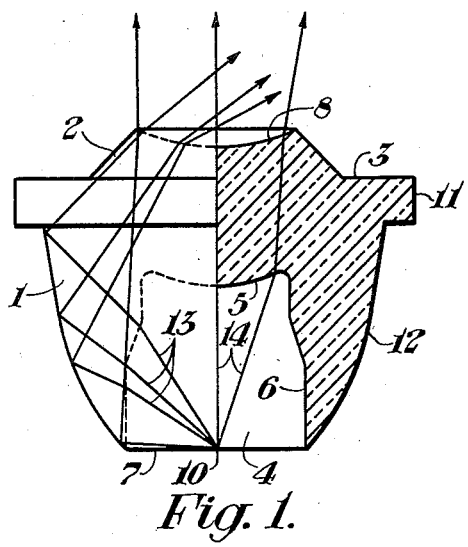
Fig. 1 is a partly sectioned elevational view showing one form of lens embodying our invention, typical light paths through the lens being provided to better illustrate its characteristic features.

Referring to the drawings, the wide angle lens illustrated in Fig. 1 comprises a light receiving and reflecting portion generally designated by the reference character 1 separated by a mounting portion 11, from an integral light transmitting portion designated as 2.

The light receiving and reflecting portion 1 is curved downwardly and inwardly from its largest width adjacent the mounting portion 11 to its smallest width adjacent a bottom surface 7. This curve forms a light reflecting outer surface wall 12. At the lower end of the curved outer surface wall 12 is a bottom surface 7 which is provided with a recess 4, opening therethrough. This recess 4 is bound by a convex bottom 5 and side wall 6 different portions of which have different diameters for a purpose which will be made clear hereinafter.

The light transmitting portion 2 is in the form of an truncated cone, the largest diameter of which is smaller than the diameter of the top of the light receiving and reflecting portion 1. This light transmitting portion 2 is provided with a smooth concave upper surface 8. This smooth concave surface substantially eliminates reflections and false indications due to sunlight or other outside sources of light.

Formed on the upper surface of the mounting portion 11 is a shoulder 3 which serves as a mounting surface for the lens. The outer and bottom surfaces of the mounting portion 11 function in some applications to help secure the lens in a suitable mounting device. The lens is intended to be illuminated from a light source, not shown, located at the point 10. Light emitted at this point will be refracted upon passing through the wall 6 of the recess and reflected upon striking the outer surface 12 of the lens; the wall 6 and surface 12 being disposed at such relative angles that substantially all of the light passing through the wall 6 will, upon subsequently striking the outer surface 12 of the light receiving and reflecting portion, be reflected at such an angle that it will pass through the light transmitting portion 2 and will emerge at the light transmitting surface 8 as indicated by the lines 13. Moreover, the curvature of the bottom 5 of the recess is such that the light from source 10, passing through this bottom surface, will also be refracted in a direction to emerge through the light transmitting surface 8 as indicated by the light rays 14.

The position of the light source is preferably within the lens recess for the greatest possible amount of light to be utilized by the lens. For example, a source of light placed even with the recess opening would deliver 50 percent of its light to the lens. However, if the source were located below the recess opening something less than 50 percent would be utilized by the lens.

Figure 2:
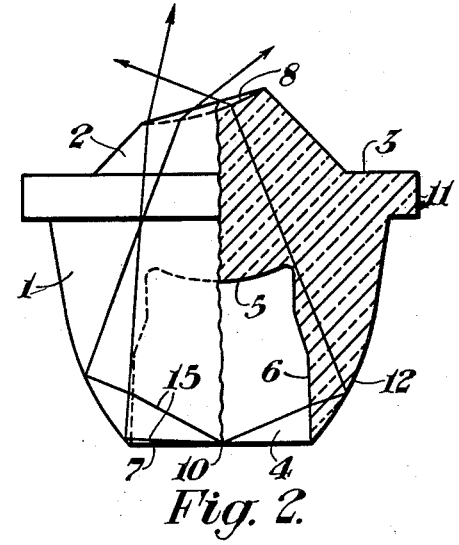
Fig. 2 is a partly sectioned elevational view of a modified form of the lens shown on Fig. 1, in which the light transmission surface is set at an angle. Typical light paths from a light source behind the lens are also shown in this view.

The lens shown in Fig. 2 is similar to the lens of Fig. 1 with the exception that the light transmitting surface 8 is disposed at an angle to the horizontal. This provides an unsymmetrical pattern about the vertical axis of the lens thus providing a lens that can be seen from one position better than from other positions around it. The paths of typical light rays originating at the point 10 are indicated by the rays 15.

Figure 3:
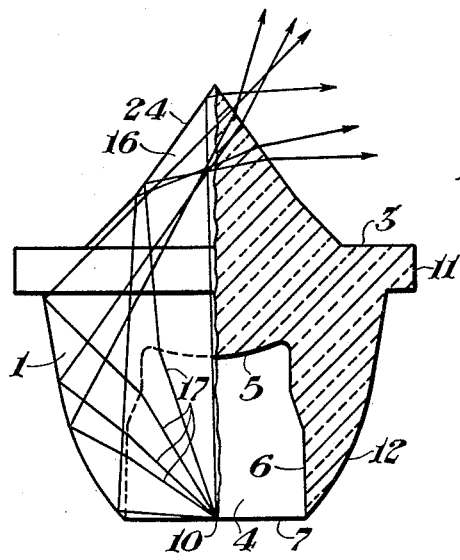
Fig. 3 is a partly sectioned elevational view showing an extremely wide angle lens embodying our invention, typical light paths through this lens from a light source behind the lens being shown.

Fig. 3 shows another form of lens which is similar to th lens shown in Fig. 1 with the exception that the light transmitting portion 2 shown in Fig. 1 has been replaced by a light transmitting portion 16 in the form of a cone. This cone produces an extremely wide angle of light dispersion through its light transmitting surface 24, as shown by the typical light rays 17.

Figure 4:
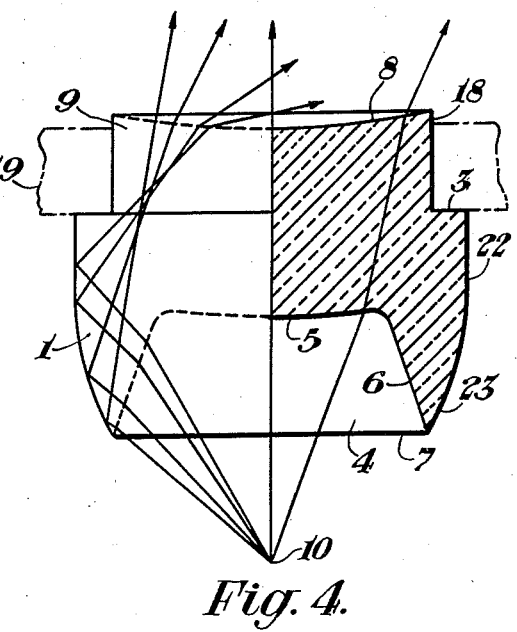
Fig. 4 is a partly sectioned elevational view of another embodiment of our wide angle lens showing typical light paths through the lens from a light source behind the lens.

Fig. 4 shows on an enlarged scale a lens capable of producing a symmetrical, spread pattern of light that is intended for mounting in a panel requiring a large number of lenses in small space, thus requiring small apertures. In this modification the lens is not provided with a mounting rim such as the rim 11 but is positioned in an opening 18 in an associated panel 19 by pressing the shoulder 3 against the associated panel. This lens is provided with a cylindrically shaped light transmitting portion 9 with a concave upper light transmitting surface 8. The light receiving and reflecting portion of this figure is in the shape of a cylinder at its upper portion 22 with an integral lower inwardly curved portion 23. Due to the fact that this modification is used for small sized panel apertures the light source is located below the lower surface of the lens. This means that less than 50 percent of the light emitted from the source will be accepted within the lens. However, since the lens is of extremely small size, the increased efficiency of this lens, due to utilization of greater angle of light from the lamp, still provides more than sufficient illumination to the light transmitting surface. A typical commercial application of this lens measures 5/16 of an inch in diameter and 3/8 of an inch length.

Figure 5:
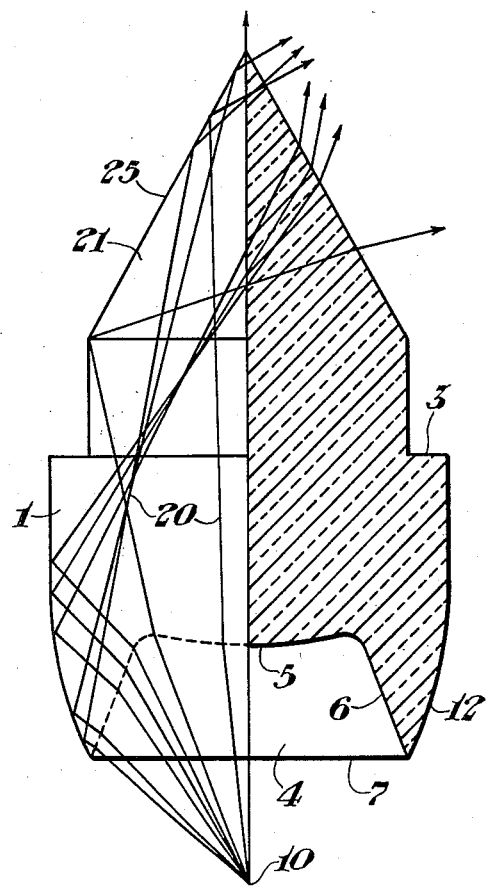
Fig. 5 is a partly sectioned elevational view of still another embodiment of an extremely wide angle lens embodying our invention, this view also including typical light paths through the lens from a light source behind the lens.

Fig. 5 is a modification of the lens shown in Fig. 4. This modification provides an extremely wide angle lens by having a light transmitting member in the form of a cone 21 with a light transmitting surface 25. Typical light paths 20 are shown by the arrow tipped lines of Fig. 5.

Figure 6:
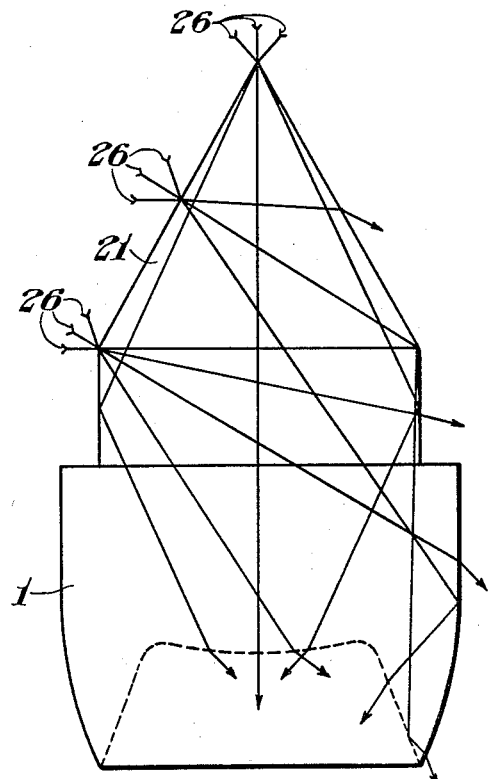
Fig. 6 is an elevational view of the lens of Fig. 5 showing typical light paths through the lens due to external light falling upon the front of the lens.
Figure 7:
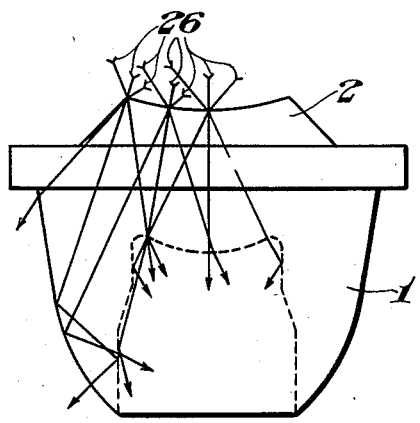
Fig. 7 is an elevational view of the lens of Fig. 1 showing typical light paths through the lens due to external light falling upon the front of the lens.
Figure 8:
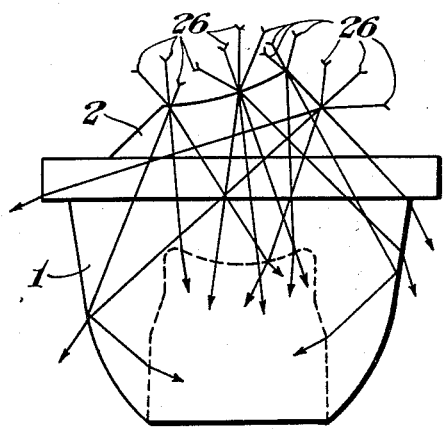
Fig. 8 is an elevational view of the lens of Fig. 2 showing typical light paths through the lens due to external light falling upon the front of the lens.

Figures 6, 7 and 8 disclose typical light paths showing how our lens, with the three different types of transmitting surfaces in cooperation with their respective light receiving and reflecting portion, function to disperse any light received through each transmitting surface from a light source external of each lens.

The light rays 26 in each of the Figures 6, 7 and 8 show how the angular relationship of the surfaces of each lens function to direct undesirable external light rays to the rear of each lens to be lost behind the mounting panel rather than being reflected back through the transmitting surface of each lens giving a false indication. This leaves each lens transmitting surface with a "dead black" appearance due to light external of the front of the lens.

Wide angle lenses of the type shown in Fig. 1 and Fig. 4 provide a symmetrical light pattern throughout an angle of 160 degrees or more. These wide angle lenses have the advantage that they project only a slight amount from the front of the panel face (or panel board) on which they are mounted. This is in contrast to the extremely wide angle lenses of the type shown in Figs. 3 and 5 which give a light pattern of 180 degrees or more. Due to their construction, the wide angle (160 degree) lenses are less subject to damage or to be the source of difficulty in cleaning the front face of the panel or model board on which they are mounted. Generally, wide angle lenses of the 160 degree symmetrical pattern type will provide a sufficient angle of indication to fill most requirements for spread without having to resort to use of the extremely wide (180 degree) angle lens, or lens without symmetrical pattern of indication such as shown in Fig. 2. Lens of unsymmetrical pattern must necessarily be indexed so as to insure that the unsymmetrical pattern of light provided in a predetermined direction is maintained when the lens is replaced. Lenses of the type described herein are capable of use in bright sunlight without causing false indications due to light reflections. This is due to the following noted reasons:

The first reason is freedom from surface reflection off of the light transmitting surface. This reflection freedom is accomplished by the curvature of the transmitting surface since dispersion of the reflected light is increased as the shape of the reflecting surface departs from a plane surface.

The second reason is the prevention of emergence of external light through the transmitting surface due to refraction and reflection within the lens causing the light to return to the transmitting surface as a false (or phantom) indication.

It is to be understood that it is within the scope of our invention to construct the lenses of colored material. It is further within the scope of our invention to construct the lenses of glass, plastic or similar materials.

Although we have herein shown and described only a few forms of lenses embodying our invention, it is to be understood that various changes and modifications may be made therein within the scope of the appended claim without departing from the spirit and scope of our invention.

Having thus described our invention, what we claim is:

An indicator lens for receiving and refracting light from a source comprising first and second cylindrical portions formed in concentric relation to have contiguous ends, said first portion arranged for inserting in an aperture of a panel and having on its free end a concave light transmitting surface for refracting into a wide viewing angle the light received through said lens from the source; a mounting surface formed intermediate said first and second portions; said second portion at its contiguous end having a larger diameter than said first portion and having a diameter which decreases from its contiguous end to its free end; said second portion having a recess bound by a tapered surface to be in the form of a truncated cone, the smaller end of the recess terminating within said second portion and the larger end of the recess comprising an opening at the free end of said second portion for accepting light from the source; the tapered surface and the cylindrical side of said second portion respectively refracting and reflecting light received from the source through the recess opening to direct the light at a proper angle to pass through said light transmitting surface over a wide angle of spread; and, said light transmitting surface being positioned relative to the cylindrical sides of said first and second portions so that the major amount of external light striking said light transmitting surface is refracted to said cylindrical sides and then reflected internally within said lens where it is dissipated and refracted away from said light transmitting surface, whereby a distinct contrast in light intensity at said transmitting surface is obtained dependent on whether said transmitting surface is receiving light from the source or whether only external light is striking said transmitting surface.

References Cited in the file of this patent

UNITED STATES PATENTS

| | | |
|---|---|---|
| 262,965 | Mark | Aug. 22, 1882 |
| 294,647 | Mark | Mar. 4, 1884 |
| 458,849 | Jacobs | Sept. 1, 1891 |
| 1,194,758 | McCarthy | Aug. 15, 1916 |
| 1,205,258 | Plowman et al. | Nov. 21, 1916 |
| 1,903,385 | Schiller | Apr. 4, 1933 |
| 1,914,819 | Rolph | June 20, 1933 |
| 2,004,443 | Kovac | June 11, 1935 |
| 2,057,395 | Sharp | Oct. 13, 1936 |
| 2,063,207 | Taylor | Dec. 8, 1936 |
| 2,215,900 | Bitner | Sept. 24, 1940 |
| 2,254,962 | Harris et al. | Sept. 2, 1941 |
| 2,458,401 | Moore | Jan. 4, 1949 |
| 2,469,080 | Rosin et al. | May 3, 1949 |
| 2,742,636 | Alden | Apr. 17, 1956 |

FOREIGN PATENTS

| | | |
|---|---|---|
| 643,364 | France | May 15, 1928 |
| 791,681 | France | Sept. 30, 1935 |
| 456,520 | Great Britain | Nov. 9, 1931 |
| 151,981 | Australia | June 22, 1953 |